June 28, 1932.  W. L. EGY  1,864,896

VERNIER FOR READING GRADUATED CIRCLES

Filed March 31, 1930  3 Sheets-Sheet 1

Inventor
Willard L. Egy
By Dodge and Sons
Attorneys

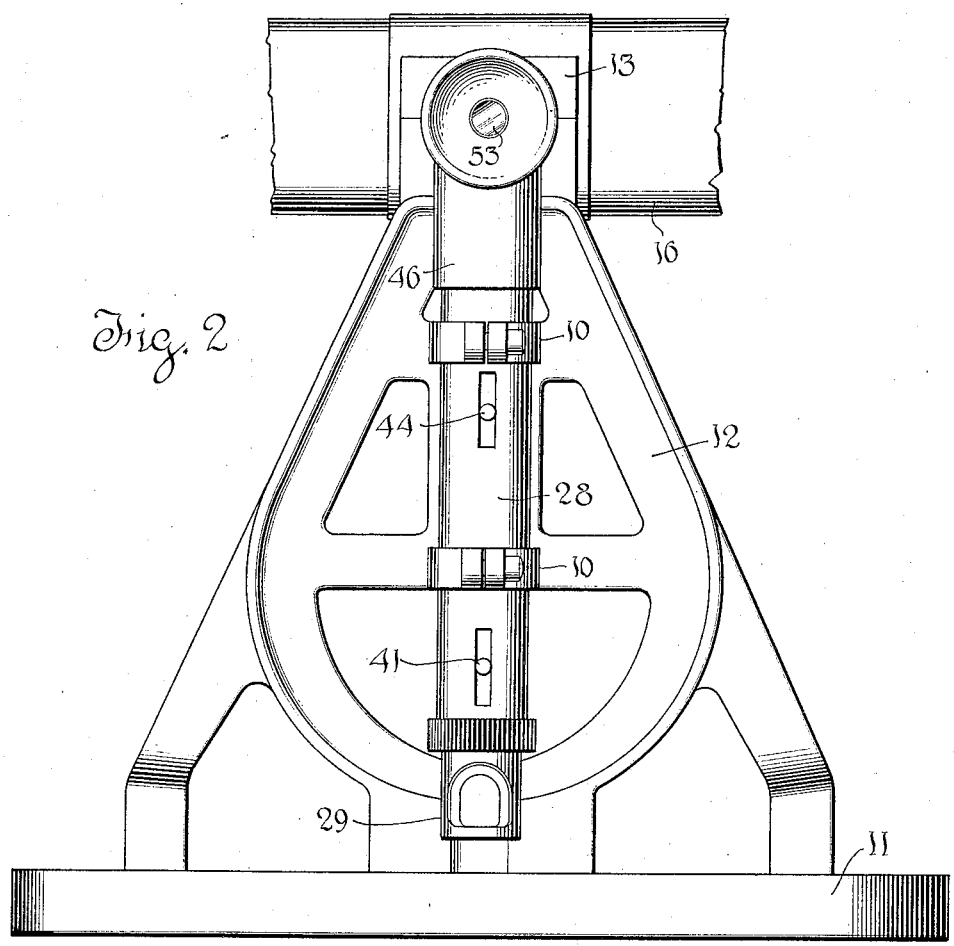
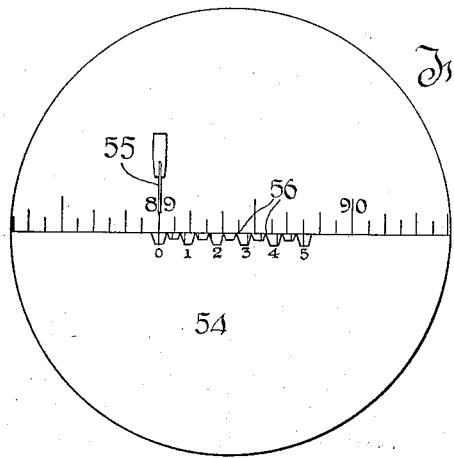
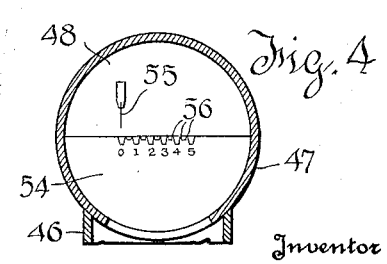

June 28, 1932. W. L. EGY 1,864,896
VERNIER FOR READING GRADUATED CIRCLES
Filed March 31, 1930   3 Sheets-Sheet 3

Inventor
Willard L. Egy
By Dodge and Sons
Attorneys

Patented June 28, 1932

1,864,896

UNITED STATES PATENT OFFICE

WILLARD L. EGY, OF TROY, NEW YORK, ASSIGNOR TO W. & L. E. GURLEY, OF TROY, NEW YORK, A CORPORATION OF NEW YORK

VERNIER FOR READING GRADUATED CIRCLES

Application filed March 31, 1930. Serial No. 440,427.

This invention relates to geometrical instruments, and particularly to instruments for precise measurement of angles, such, for example, as theodolites, transits and range finders.

Such instruments involve the use of graduated circles, called limbs, and in instruments of this general class, it is customary to read the limb at two points, preferably diametrically opposite each other. The readings are commonly taken by the use of verniers, and the two readings are averaged to neutralize errors which may be introduced by slight eccentricity of the circle or limb relatively to the axis. The verniers are difficult to construct and maintain, and the double reading and averaging complicate manipulation and the recording of the readings, as is well understood.

The present invention avoids such difficulties, permitting the taking of a single reading which is the desired average reading; and, by producing what may be called an imaginary or optical vernier, does away with many mechanical difficulties of construction and maintenance.

Generally stated, the underlying principle involves the simultaneous projection of two adjacent images of scale graduations from diametrically opposite portions of the limb, the spacing of the graduations in the two images as projected differing in a definite relation so that one image may be read against the other and adacent image as a vernier.

It is important to observe that it is the relative proportions of the graduations in the projected images that control the vernier effect. This relative proportioning can be secured in various ways, but there are advantages in using differential magnification of diametrically opposite portions of the same circular series of graduations. To establish such differential in the actual graduations would require two series of graduations on circles of different diameters. This introduces possibilities of error and is consequently objectionable. In any event, it is necessary to use a separate microscope to project each image, and these are of different focal lengths in the embodiment shown. It is therefore as simple and more accurate to choose microscopes of properly related powers, and project with different degrees of magnification images of diametrically opposed portions of the same scale.

By selecting this preferred and better arrangement equivalent arrangements are not excluded but fall within the broad scope of the invention and are intended to be covered by the generic claims. Modifications of the invention will be covered by subordinate applications and will there be specifically claimed.

The broad concept of what may be called an "optical vernier" in which the vernier is an optical image of the same or a related scale, is not here claimed except in combination with features characteristic of the present disclosure, but is the subject matter of my application Ser. No. 440,426, filed March 31, 1930, in which it is broadly claimed.

In the illustrated embodiment of the present invention, since the images are of opposite portions of the same circle or limb, and since both microscopes are of the same type, they appear to move in opposite directions at lineal speeds which differ slightly. The fact that both scales move introduces certain characteristics not found in conventional verniers. The conventional vernier has one more or one less division in a given length than has the graduated scale with which it coacts. For example, to read tenths, nine divisions of the scale, or eleven divisions of the scale, subtend ten on the vernier. In the illustrated embodiment of the present invention the disparity is two divisions, and a system to read tenths is preferably so arranged that nine divisions on the scale image subtend eleven divisions on the vernier image. Another peculiarity is that there are two series of coincidences between graduations of the two images. As this tends to be confusing, a feature of the preferred embodiment of the invention is a selective screen which functions to render one series of coincidences invisible and also assists in reading or counting the subdivisions.

The preferred embodiment of the invention is illustrated in the accompanying drawings, in which,—

Fig. 2 is an elevation looking from the right relatively to Fig. 1.

Fig. 3 is a view of the image seen through the common eye-piece of the two microscopes.

Fig. 4 is an enlarged section on the line 4—4 of Fig. 1.

Figure 1:
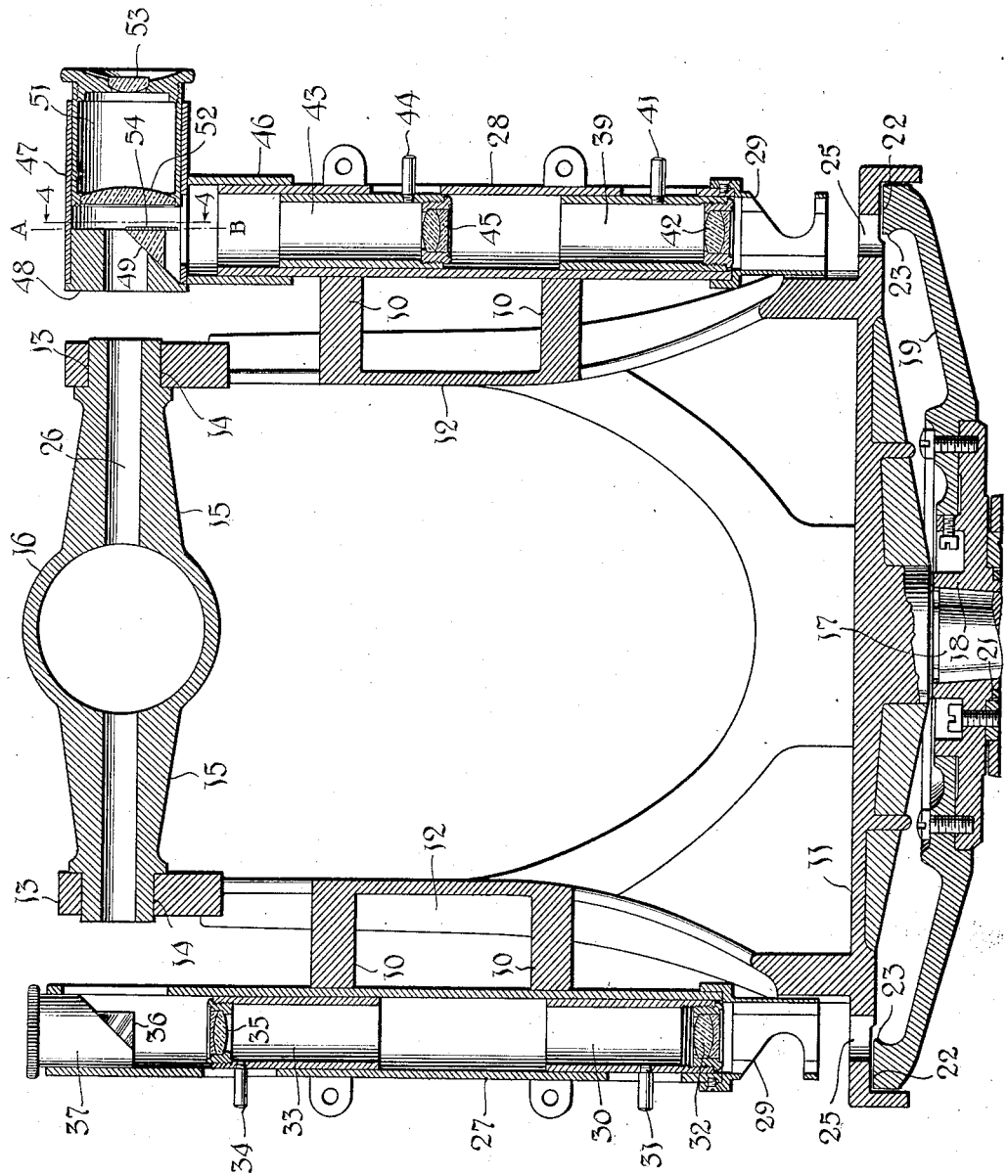
Fig. 1 is a vertical axial section through the telescope trunnion and through the axes of the microscopes. In this view so much of the structure of the telescope, transit frame and the limb, as is necessary to an understanding of the invention, is illustrated.

In the drawings only such parts of the transit as are necessary to an understanding of the invention are illustrated. The base plate of the transit frame is shown at 11 and the standards at 12. The standards are provided with bearings 13 which receive the journals 14 at the end of the telescope trunnions 15. It will be understood that when the instrument is set up and properly leveled the axis of the trunnions 15 is horizontal.

A portion of the telescope tube is indicated at 16. The base 11 may be oriented about a vertical axis which is the geometrical axis of the tapered spindle 17. This axis is vertical when the instrument is set up. The tapered spindle 17 turns in a tapered sleeve or quill 18 which carries the horizontal limb 19. The quill 18 turns in a bearing structure, a portion of which appears at 21, and this bearing structure is carried on the usual leveling head, not shown. The leveling head is a familiar part of all transits and its specific form is not involved in the present invention.

The usual clamps and tangent screws have been omitted to simplify the drawings. It will be understood by those skilled in the art that these clamp the limb 19 either to the leveling head or to the base plate 11, or both, and when so clamped provide for minute angular adjustment between the clamped parts.

Figure 5:
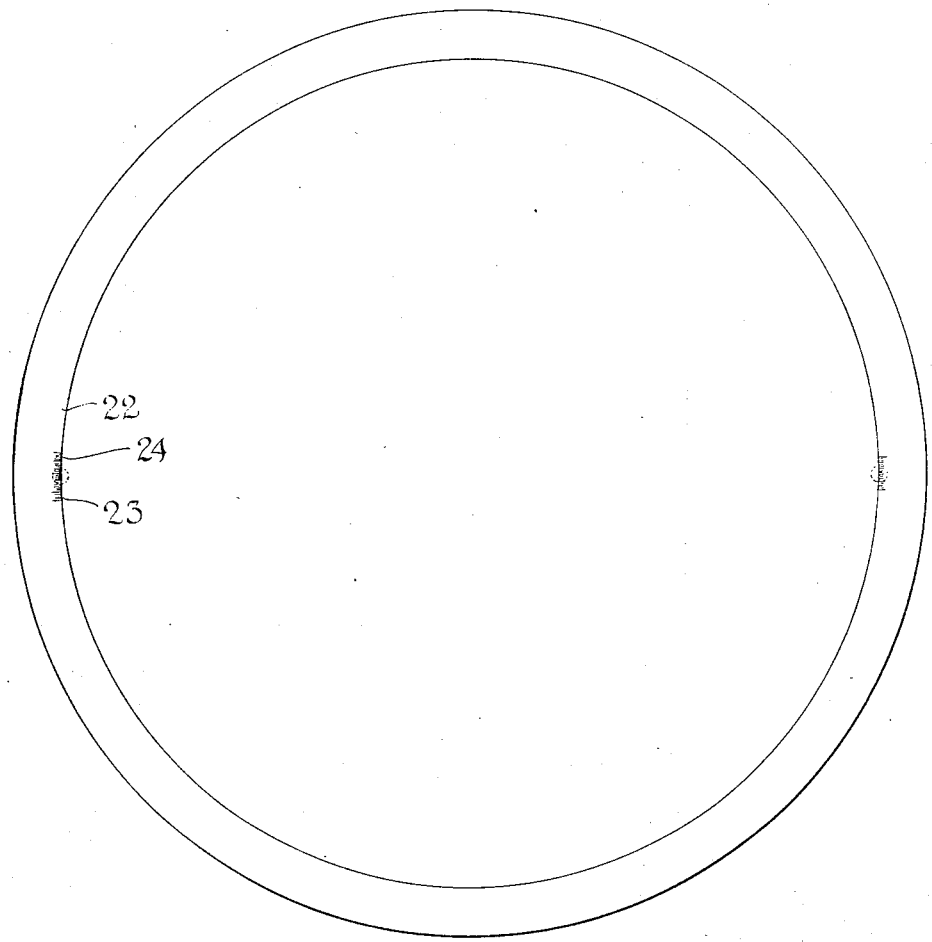
Fig. 5 is a diagrammatic plan view showing the limb and the fields of view of the two microscopes.

The limb 19 has an annular graduated face 22, the graduations extending from the inner sharp edge 23, as indicated at 24 in Fig. 5. In the example chosen for illustration each graduation subtends five minutes of angle, but any known system of graduations may be used. The graduations are visible at diametrically opposite points on the base 11 through openings 25 formed for that purpose. In the usual construction the base 11 carries vernier plates on the under side, the edges of the vernier plates approaching closely to the edge 23 and the upper face of the vernier plates being in the plane of the graduated face 22.

In the present construction there are no vernier plates. Instead of this arrangement the graduations at the two diametrically opposite points are read through a single eye-piece common to two distinct microscopes, one microscope corresponding to one point on the base 11 and the other corresponding to a diametrically opposite point.

While various arrangements are possible, I prefer the arrangement shown, in which the image from one microscope is projected through the axis of the trunnions 15 and for this reason the trunnions 15 are shown with a hollow axial bore 26.

The frame 12 is provided with clamping brackets 10, there being two such brackets at each side of the instrument. One pair of brackets holds a microscope tube 27 and the other holds a microscope tube 28. Each of these microscope tubes is provided with a corresponding light shield 29 which is swiveled on its lower end so as to be adjustable to control the illumination of the surface plate 22 by natural light. Artificial illumination may obviously be provided, if desired or necessary. Artificial illumination being well known in surveying instruments, it is deemed unnecessary to illustrate this.

Vertically slidable in the lower end of the tube 27 is a focusing sleeve 30 which is adjusttable upward and downward by means of the lug 31 which extends through the slot in the tube 27. The tube 30 carries at its lower end an objective lens 32, illustrated as a doublet. Mounted in the tube 27 above the sleeve 30 is a second focusing sleeve 33 which is adjustable by a lug 34 which extends through a corresponding slot in the tube 27. The sleeve 33 carries at its upper end a second objective 35 also illustrated as a doublet. Mounted in the upper end of the tube 27 is a total reflecting prism 36. This prism 36 is carried by a mount 37 which is adjustable in the tube 27.

The objective 32 focuses a real image on a plane intermediate the objectives 32 and 35, and this real image is projected by the objective 35 to a plane A—B which is a vertical plane perpendicular to the axis of the trunnions 15 and preferably coincident with the center line of the tube 28. The axis of the optical system represented by the objectives 32 and 35, passes through the edge 23 of the graduated face 22. The reason for using two objectives 32 and 35 is to permit not only the focusing of the image of the graduated surface 22 on the plane A—B, but an adjustment of the magnification of that image.

Except that it differs in power the microscope contained in the tube 28 is similar to that contained in the tube 27. It has a lower focusing sleeve 39, focusing lug 41 and objective 42, mechanically similar to the parts 30, 31 and 32. In the tube 28 above the sleeve 39 is a second focusing sleeve 43 with lug 44 and objective 45. These parts are similar to parts 33, 34 and 35, except that the tube 43 is mounted with the objective 45 at its lower end.

The axis of the optical system made up of the lenses 42 and 45 is preferably coincident with the plane A—B, and preferably passes through the edge 23 of the graduated face 22. Mounted on the upper end of the microscope tube 28 is a sleeve 46 which carries the horizontal tube 47. Mounted in the tube 47 is a bushing 48 which carries a total reflecting prism 49. The objective 42 forms a real image between it and the objective 45 and the objective 45 projects this image as a second real image in the plane A—B, prism 49 serving to turn the light rays and project that image on a vertical plane.

The mount 37 which carries the prism 36 should be so adjusted relatively to the prism 39 that the two real images of diametrically opposite portions of the graduated face 22 appear edge to edge, as is indicated in Fig. 3.

As indicated in Figs. 3 and 5, the total angle subtended by the field of view of either microscope is of the order of 2°, and for such an angle the arc of the edge 23 appears to be a straight line even when magnified. The fractional graduations, i. e., the five minute graduations, appear to be parallel. That part of the scale which is actually read for coincidence subtends an angle of only forty-five minutes on one scale and fifty-five minutes on the other scale, in the particular example illustrated. The sleeves 33 and 30 in the microscope tube 27 are adjusted to give one magnification, and the sleeves 39 and 43 in the tube 28 are adjusted to give a different magnification. The powers of the two microscopes may be chosen at will but the ratio of magnification as between the two tubes should for the type of vernier illustrated be nine for the tube 27 and eleven for the tube 28, to read tenths. To read fifths the ratio is 4 to 6, and so on. The particular type of vernier is not material.

Precise adjustment for magnification can be made at any time, it being necessary merely to cause nine graduations on what appears to be the upper scale (see Fig. 3) to subtend eleven graduations on the lower scale. The two images at the plane A—B are viewed through a magnifying eyepiece which consists of a focusing tube 51 which is slidable in the tube 47 and carries an optical system consisting of a lens 52 and a lens 53.

As stated above, when there is relative rotation of the base 11 and limb 23, the upper image (see Fig. 3) moves in one direction, and the lower image moves in the opposite direction. That is, there is a displacement of each scale corresponding to such movement and the apparent rates of movements are necessarily different because of the differential magnification. This is the reason that the peculiar ratio of nine to eleven is used, and that ratio introduces not a single progressive series of coincidences as in the common vernier, but two series of alternating coincidences. The coincidences on the vernier run as indicated herein in which the useless coincidences are put in parentheses (6) 1 (7) 2 (8) 3—, the useful coincidences running up to 9. The useless coincidences run out at one end and come in at the other, as will be apparent. The useless series would be confusing, but fortunately can be masked out by a toothed screen 54, whose contour is indicated in Fig. 3 and whose form is clearly indicated in Fig. 4.

The peaks 56 blot out the undesired coincidences, the desired coincidences being visible in the intervening valleys which are alternately made deep and shallow merely as an expedient to facilitate counting spaces.

The position of the screen 54 is indicated in Fig. 1, and, as will be observed, its rear face is substantially coincident with the focal plane A—B. In this position it partly masks the image projected through the tube 28. Mechanically it is a part of that microscope and moves with the microscope relatively to the graduated face 22. Optically it might be mounted at any point in the microscope where it produced the necessary masking effect. Optically all it does is to mask portions of the graduations as viewed through the microscope tube 28. From a mechanical standpoint it is more convenient to place the mask in the plane A—B than it would be to mount it, for example, on the base 11 immediately above that portion of the graduated face 22 which is viewed through the tube 28.

Mounted in conjunction with the screen 54 is an index 55 which reads against the image projected through the microscope 27. Here, too, it is more convenient to mount the index in the plane A—B, as shown, but as this index reads against that image of the scale which is seen through the microscope 27, it conceivably may be mounted at any point in which it is viewed in relation to that portion of the graduated surface 22 which is viewed through the microscope 27. For mechanical reasons merely it is better to mount the index 55 in the focal plane A—B than it would be to mount it on the lower face of the base 11 adjacent the graduated face 22. The final result is the same in either case.

It will be apparent to those skilled in the art that adjacent images of the character here described may be secured by optical systems specifically different from that illustrated. The use of total reflecting systems specifically different from that shown would enable adjacent images to be projected at various points as it might be desired. This means that the eye-piece might be variously located.

The invention is applicable to the reading of vertical as well as horizontal limbs, and, in fact, is applicable to the reading of angles generally. Precise standardization might be availed of to make the focusing adjustment in the microscope unnecessary. While differential magnification of opposite portions of the same scale is believed to be most accurate and the simplest way of securing the desired result, the essential thing is that two images of diametrically opposed graduations on the limb are projected in juxtaposition to each other, and that these images as projected have the necessary differential relation to permit one to serve as a vernier in connection with the other. It is immaterial, so far as the broad aspects of the invention are concerned, whether the differential be produced by magnification or otherwise.

While I have suggested a nine to eleven ratio, this is for illustrative purposes only. Obviously the invention is not limited to reading tenths, and various arrangements and ratios might be adapted to give a useful result and avail of the characteristics of the invention. The important point is that the instrument permits a single precsie vernier reading which is the full equivalent in all respects of the average heretofore taken of two diametrically opposed vernier readings.

The vernier chosen for illustration has the characteristic that if $n$ represent the denominator of the fraction read by the vernier, then $n-1$ graduations on one scale subtend $n+1$ graduations on the other.

While this type of vernier is believed to be the most practical for this character of reading, I do not mean to imply that it is the only type possible, nor do I intend to limit my claims to this particular type except where specifically stated.

What is claimed is:—

1. The method of reading a graduated circle, which consists in projecting two juxtaposed optical images from points substantially diametrically opposite each other on the circle, the scale of one of said images differing from the scale of the other image in a vernier ratio, and reading one of said images against the other as a vernier.

2. The method of reading a graduated circle, which consists in projecting two juxtaposed optical images from points substantially diametrically opposite each other on the circle, and at the same radial distance from the center of the circle, one of said images being projected on a larger scale than the other the scales of projection having a vernier ratio, and reading one image against the other as a vernier.

3. The method of reading a graduated circle, which consists in projecting two juxtaposed optical images from points substantially diametrically opposite each other on the circle, and at the same radial distance from the center of the circle, said images being differentially magnified in a vernier ratio, and reading one image against the other as a vernier.

4. The method of reading a graduated circle, which consists in projecting two juxtaposed optical images from points substantially diametrically opposite each other on the circle, and at the same radial distance from the center of the circle, one of said images being projected on a larger scale than the other the scales of projection having a vernier ratio, and the two images appearing to move in reverse directions, one relatively to the other, and reading one image against the other as a vernier.

5. The method of reading a graduated circle, which consists in projecting two juxtaposed optical images from points substantially diametrically opposite each other on the circle, and at the same radial distance from the center of the circle, said images being differentially magnified in a vernier ratio and appearing to move in reverse directions, one relatively to the other, and reading one image against the other as a vernier.

6. The method of reading a graduated circle, which consists in projecting two juxtaposed optical images from points substantially diametrically opposite each other on the circle, and at the same radial distance from the center of the circle, said images being differentially magnified in the proportion $$\frac{n+1}{n-1}$$

where $n$ is the denominator of the fraction to be read, and reading one image against the other as a vernier.

7. Apparatus for reading a graduated circle, comprising two optical systems mounted to rotate as a unit relatively to an axis coincident with the axis of the circle, said optical systems including means to project juxtaposed images of the scale from diametrically opposite points; and focusing means for varying the relative proportions of said projected images to establish a vernier ratio of projection.

8. Means for reading a graduated circle, comprising two optical systems mounted to rotate as a unit relatively to an axis coincident with the center of said circle, said optical systems being capable of projecting two juxtaposed images from points on the circle diametrically opposite each other, one of said images being projected at a scale different from the other the two images having a vernier ratio, whereby one image serves as a vernier with reference to the other there being more than one series of graduation coincidences as the images are shifted one graduation interval; and a screen adapted to conceal all such coincidences except those of one series.

9. Apparatus for reading a graduated circle, comprising two optical systems mounted to rotate as a unit relatively to an axis coincident with the axis of the circle, said optical system including means to project juxtaposed images of the scale from diametrically opposite points; focusing means for varying the relative proportions of said projected images to establish different vernier ratios; and a single magnifying eye-piece for viewing said juxtaposed images.

10. Apparatus for reading a graduated circle; comprising two optical systems mounted to rotate as a unit relatively to an axis coincident with the axis of the circle, said optical systems including means to project juxtaposed images of the scale from diametrically opposite points; focusing means for varying the relative proportions of said projected images to establish different vernier ratios; a screen for obliterating portions of one of said images; and a single magnifying eye-piece for viewing both of said images.

11. Apparatus for reading a graduated circle, comprising two optical systems mounted to rotate as a unit relatively to an axis coincident with the axis of the circle, said optical systems including means to project juxtaposed images of the scale from diametrically opposite points; focusing means for varying the relative proportions of said projected images to establish different vernier ratios; and an eye-piece for viewing said juxtaposed images.

12. Apparatus for reading a graduated circle, comprising two optical systems mounted to rotate as a unit relatively to an axis coincident with the axis of the circle, said optical systems including means to project juxtaposed images of the scale from diametrically opposite points; focusing means for varying the relative proportions of said projected images to establish different vernier ratios; a screen for obliterating portions of one of said images; and an eye-piece for viewing both of said images.

In testimony whereof I have signed my name to this specification.

WILLARD L. EGY.